(12) United States Patent
Zhao et al.

(10) Patent No.: US 11,807,121 B2
(45) Date of Patent: Nov. 7, 2023

(54) POWER DISTRIBUTION SYSTEM INCLUDING REMOTELY CONTROLLABLE POWER RECEPTACLE AND AN ELECTRIC VEHICLE MOBILE CHARGER HAVING AN ACTUATABLE POWER CONNECTION MECHANISM

(71) Applicant: GM GLOBAL TECHNOLOGY OPERATIONS LLC, Detroit, MI (US)

(72) Inventors: Xiang Zhao, Novi, MI (US); Ningjian Huang, Bingham Farms, MI (US); John P. Spicer, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 136 days.

(21) Appl. No.: 17/155,240

(22) Filed: Jan. 22, 2021

(65) Prior Publication Data
US 2022/0234461 A1 Jul. 28, 2022

(51) Int. Cl.
*B60L 53/37* (2019.01)
*B60L 53/16* (2019.01)
*B60L 53/66* (2019.01)
*B60L 53/30* (2019.01)
*B60L 53/68* (2019.01)

(52) U.S. Cl.
CPC .............. *B60L 53/37* (2019.02); *B60L 53/16* (2019.02); *B60L 53/305* (2019.02); *B60L 53/66* (2019.02); *B60L 53/68* (2019.02)

(58) Field of Classification Search
None
See application file for complete search history.

(56) References Cited

U.S. PATENT DOCUMENTS

| | | |
|---|---|---|
| D628,609 S | 12/2010 | Linn et al. |
| 7,992,733 B2 | 8/2011 | Laliberte et al. |
| 8,181,799 B2 | 5/2012 | Laliberte et al. |
| 8,424,941 B2 | 4/2013 | Ihrke et al. |
| 8,498,741 B2 | 7/2013 | Ihrke et al. |
| 8,511,964 B2 | 8/2013 | Linn et al. |
| 8,562,049 B2 | 10/2013 | Ihrke et al. |
| 8,601,897 B2 | 12/2013 | Lauzier et al. |
| 8,849,453 B2 | 9/2014 | Bergelin et al. |
| 9,085,308 B2 | 7/2015 | Laliberte et al. |
| 9,266,440 B2 | 2/2016 | Gao et al. |
| 9,770,993 B2 | 9/2017 | Zhao et al. |
| 10,293,699 B2 | 5/2019 | Zhao et al. |
| 10,549,645 B2 | 2/2020 | Zhao et al. |
| 10,828,770 B2 | 11/2020 | Zhao et al. |
| 10,875,420 B2 | 12/2020 | Grimm et al. |
| 2013/0024877 A1 | 1/2013 | Morimoto et al. |
| 2013/0112641 A1 | 5/2013 | Laliberte et al. |
| 2016/0352113 A1* | 12/2016 | Zhao ...................... B60L 53/14 |
| 2019/0047426 A1* | 2/2019 | Effenberger .......... B60L 53/665 |

(Continued)

*Primary Examiner* — David V Henze-Gongola (57) ABSTRACT

A power distribution system includes a charging station, a plurality of power socket assemblies, and at least one power line. The charging station includes a charging station control module. The plurality of power socket assemblies are operable to supply power to a vehicle. The at least one power line electrically connects the charging station to each of the plurality of power socket assemblies. The charging station is configured to supply power to any one of the plurality of power socket assemblies through the at least one power line.

14 Claims, 6 Drawing Sheets

(56) References Cited

U.S. PATENT DOCUMENTS

2019/0061542 A1    2/2019  Zhao et al.
2019/0184850 A1*   6/2019  Lee ........................ B60L 53/68
2020/0101856 A1*   4/2020  Klausner ................ B60L 53/30

* cited by examiner

POWER DISTRIBUTION SYSTEM INCLUDING REMOTELY CONTROLLABLE POWER RECEPTACLE AND AN ELECTRIC VEHICLE MOBILE CHARGER HAVING AN ACTUATABLE POWER CONNECTION MECHANISM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to power distribution systems including a remotely controllable power receptacle and an electric vehicle mobile charger having an actuatable power connection mechanism.

Power distributions systems for electric vehicles typically include stationary charging stations that are only capable of charging electric vehicles parked nearby the charging stations. For example, the charging stations are typically equipped with a power cord that is used to electrically connect the battery of an electric vehicle with a power source such as an electrical grid. Since the charging stations are stationary, the charging stations are only capable of charging electric vehicles parked within reach of the power cord. Thus, the number of electric vehicles that can be charged by each of the charging stations is limited.

SUMMARY

An example of a power distribution system according to the present disclosure includes a charging station, a plurality of power socket assemblies, and at least one power line. The charging station includes a charging station control module. The plurality of power socket assemblies are operable to supply power to a vehicle. The at least one power line electrically connects the charging station to each of the plurality of power socket assemblies. The charging station is configured to supply power to any one of the plurality of power socket assemblies through the at least one power line.

In one example, the at least one power line includes a single power line that electrically connects the charging station to all of the plurality of power socket assemblies.

In one example, the at least one power line includes a first power line and a second power line. The first power line electrically connects the charging station to a first subset of the plurality of power socket assemblies. The second power line electrically connects the charging station to a second subset of the plurality of power socket assemblies.

In one example, the at least one power line includes a main power line and a plurality of branch power lines. The main power line electrically connects the charging station to the plurality of branch power lines. Each of the plurality of branch power lines electrically connects the main power line to at least one of the plurality of power socket assemblies.

In one example, each of the plurality of power socket assemblies includes a power socket and a switch operable to regulate current flow from the at least one power line to the power socket.

In one example, each of the plurality of power socket assemblies further includes a power socket control module configured to open and close the switch in response to a wireless control signal.

In one example, each of the plurality of power socket assemblies further includes a socket cover that allows access to the respective socket when the socket cover is open and prevents access to the respective socket when the socket cover is closed, and each of the plurality of power socket assemblies further includes a power socket control module configured to open and close the socket cover in response to a wireless control signal.

In one example, the power distribution system further includes a mobile charger. The mobile charger includes a power plug for electrically connecting the vehicle to the power socket of any one of the plurality of power socket assemblies. The mobile charger is operable to move to align the power plug with the power socket.

In one example, the mobile charger further includes a base, a plurality of wheels attached to the base, and an electrical connector into which the power plug integrated, and the electrical connector is configured to extend and retract relative to the base to respectively insert the power plug into the power socket of any one of the plurality of power socket assemblies and withdraw the power plug from the power socket.

In one example, the mobile charger further includes a mobile charger control module and a contact sensor integrated into the power plug, and the mobile charger control module is configured to determine whether the power plug is inserted into the power socket of any one of the plurality of power socket assemblies based on an input from the contact sensor.

In one example, the mobile charger control module is configured to generate a wireless ON code signal when the power plug is inserted into the power socket of any one of the plurality of power socket assemblies and, in response to the wireless ON code signal, the charging station control module is configured to close the switch in the respective one of the plurality of power socket assemblies to supply power to the power socket of the respective one of the plurality of power socket assemblies.

In one example, the mobile charger control module is configured to generate a wireless OFF code signal when the power plug is withdrawn from the power socket of any one of the plurality of power socket assemblies and, in response to the wireless OFF code signal, the charging station control module is configured to open the switch in the respective one of the plurality of power socket assemblies to interrupt power supply to the power socket of the respective one of the plurality of power socket assemblies.

In one example, the mobile charger further includes a mobile charger control module and an image sensor integrated into the power plug, and the mobile charger control module is configured to determine whether the power plug is aligned with the power socket of any one of the plurality of power socket assemblies based on an input from the image sensor.

In one example, the mobile charger further includes a mobile charger control module, an image sensor integrated into the power plug, and an air nozzle, and each of the plurality of power socket assemblies further includes a socket cover operable to open and close to respectively allow and prevent access to the respective socket. In addition, the mobile charger control module is configured to determine whether a substance is disposed on a top surface of the socket cover of any one of the plurality of power sockets assemblies based on an input from the image sensor, and control the air nozzle to spray air toward the socket cover when the substance is disposed on the top surface of the socket cover.

In one example, the mobile charger further includes a base, a plurality of wheels attached to the base, and a protection shield coupled to the base, and the protection shield is configured to extend and retract relative to the base to respectively create a seal around the socket cover of any one of the plurality of power socket assemblies and break the seal.

An example of a mobile charger according to the present disclosure includes a base, a plurality of wheels, an electric motor, a power plug, and a mobile charger control module. The plurality of wheels are attached to the base. The electric motor is configured to drive at least one of the plurality of wheels. The power plug is coupled to the base and configured to electrically connect a vehicle to a power socket. The mobile charger control module is configured to control the electric motor to move the mobile charger in order to align the power plug with the power socket.

In one example, the mobile charger further includes an electrical connector into which the power plug is integrated. The electrical connector is operable to extend from the base and retract into the base to respectively insert the power plug into the power socket and withdraw the power plug from the power socket.

In one example, the mobile charger further includes a contact sensor integrated into the power plug. The mobile charger control module is configured to determine whether the power plug is inserted into the power socket based on an input from the contact sensor.

An example of a power socket assembly according to the present disclosure includes a power socket, a socket cover, and a power socket control module. The socket cover is operable to open and close. The socket cover allows access to the power socket when the socket cover is open. The socket cover prevents access to the power socket when the socket cover is closed. The power socket control module is configured to open and close the socket cover in response to a wireless control signal.

In one example, the power socket assembly further includes an electric motor, a plurality of shutters, and at least one of a gear and a linkage mechanically connecting the electric motor to the plurality of shutters. The plurality of shutters are movable between a first position and a second position. The socket cover is open when the plurality of shutters are in the first position. The socket cover is closed when the plurality of shutters are in the second position. The power socket control module is configured to control the electric motor to move the plurality of shutters between the first position and the second position in response to the wireless control signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

New power distribution systems have been developed to overcome the shortcomings of a power distribution system including stationary chargers. One such power distribution system includes a stationary charging station controller electrically connected to a power source, a mobile charger electrically connected to the charging station controller, and guide rails along which the mobile charger moves. In one example, the mobile charger is a high-power mobile direct current (DC) charger, and the mobile charger is electrically connected to the charging station controller using a DC fast charging cable.

In another example, the mobile charger is electrically connected to the charging station controller using a pair of contact wires placed underground and extending along the guide rails, and a pair of conductor poles extending from the mobile charger to the contact wires. The contact wires are electrically connected to the charging station controller with one of the contact wires forming a supply side of a circuit and the other contact wires forming a return side of the circuit. Each of the conductor poles is in contact with one of the contact wires to complete the circuit. The conductor poles extend through openings in the ground surface that provide access to the contact wires.

The mobile charger is equipped with a power chord that electrically connects the mobile charger to the battery of an electric vehicle. Since the mobile charger is able to move along the guide rails, the power distribution system is able to charge an electric vehicle parked in any parking space that is positioned adjacent to the guide rails. In one example, the guide rails extend past several parking spaces, and therefore the power distribution system is capable of charging several electric vehicles without moving the electric vehicles.

Despite this benefit, the power distribution system may have some issues. For example, a DC fast charging cable is heavy due to its thick gauge, so therefore it is not practical for the mobile charger to drag such a long and heavy cable as it travels a long distance to charge multiple electric vehicles. In another example, the guide rails for the mobile charger are not flexible in layout and require a high cost to install. In yet another example, it may not be desirable to have the openings through which the conductor poles extend in order to contact the contact wires.

A power distribution system according to the present disclosure incorporates various aspects that overcome the issues noted above. In one example, the power distribution system includes a stationary charging station controller, multiple power sockets placed near parking spaces at ground surface and electrically connected to the charging station controller, and a mobile charger. The power sockets are electrically connected to the charging station controller using one or more power lines that are placed underground. The mobile charger is operable to electrically connect the battery of an electric vehicle parked in one of the parking spaces to one of the power sockets disposed near that parking space. In addition, the mobile charger is operable to move autonomously from one power socket to another power socket to charge all electric vehicles parked in the parking spaces without moving the electric vehicles.

Since the mobile charger is electrically connected to the charging station controller using stationary power lines and power sockets, there is no need for the mobile charger to drag along a charging cable. Since the mobile charger moves from power socket to power socket autonomously, there is no need for guide rails, which increases the number of possible layouts of the power distribution system and decreases the installation cost thereof. Since the power sockets are placed at ground surface, there is no need for openings in the ground surface such as those described above that provide access to the contact wires.

Figure 1:
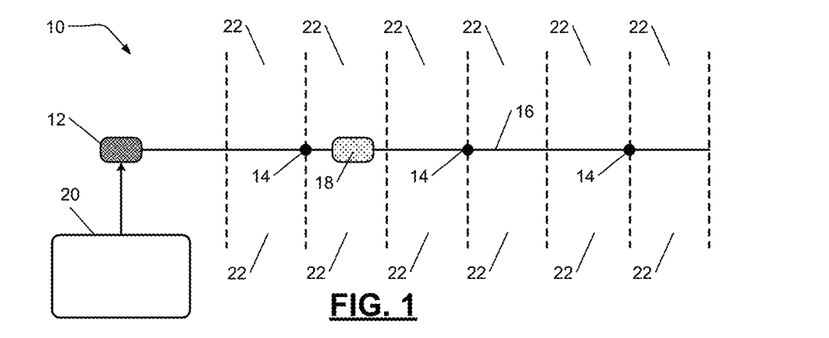
FIG. 1 is a functional block diagram illustrating a first example of a power distribution system according to the present disclosure.

Referring now to FIG. 1, a power distribution system 10 includes a charging station 12, power socket assemblies 14, a power line 16 electrically connecting the charging station 12 to the power socket assemblies 14, and a mobile charger 18. The charging station 12 is configured to supply power to any one of the power socket assemblies 14 through the power line 16. The power socket assemblies 14 and/or the power line 16 may be placed underground and/or on the surface of the ground.

The charging station 12 includes a switch (not shown) and a charging station control module 20 that controls the switch. The switch has an input electrically connected to a power source (not shown) and an output electrically connected to the power line 16. The power source may be an alternating current (AC) power source or a direct current (DC) power source. The voltage supplied by the power source may be within a range from 120 volts (V) to 500 V. For example, the voltage supplied by the power source may be 120 V AC, 240 V AC, or 480 V DC.

The charging station control module 20 closes the switch to electrically connect the power socket assemblies 14 to the power source and thereby supply power to the power socket assemblies 14. The charging station control module 20 opens the switch to electrically disconnect the power socket assemblies 14 from the power source and thereby interrupt power supply to the power socket assemblies 14. Although the charging station control module 20 is shown separate from the charging station 12, the charging station control module 20 may be housed within the charging station 12.

In the example shown in FIG. 1, each power socket assembly 14 is disposed at the intersecting point of four parking spaces 22 and is therefore positioned to supply power to an electric vehicle (not shown) parked in any one of the four parking spaces 22. In other examples, one of the power socket assemblies 14 may be placed at each parking space 22 such that the number of power socket assemblies 14 is equal to the number of parking spaces 22. Each power socket assembly 14 can be remotely (or wirelessly) turned on and off to start or stop power supply from the power socket assembly 14 to an electric vehicle connected thereto. In one example, the charging station control module 20 generates a wireless control signal to turn on or off any one of the power socket assemblies 14. In this example, the charging station control module 20 determines which one of the power socket assemblies 14 (if any) the charging station 12 is to supply power.

The mobile charger 18 is operable to electrically connect one of the power socket assemblies 14 to an electric vehicle parked in one of the parking spaces 22. When the mobile charger 18 is positioned above one of the power socket assemblies 14, the mobile charger 18 may electrically connect that power socket assembly 14 to an electric vehicle parked in one of the parking spaces 22 adjacent thereto. The mobile charger 18 moves autonomously to position itself above one of the power socket assemblies 14.

In one example, the mobile charger 18 generates a wireless ON code signal when the mobile charger 18 is electrically connected to one of the power socket assemblies 14. The wireless ON code signal indicates an ON code. If the ON code indicated by the wireless ON code signal matches a predetermined ON code, the charging station control module 20 generates the wireless control signal to turn on the power socket assembly 14 to which the mobile charger 18 is connected. In this manner, the charging station control module 20 ensures that the ON code is authentic to ensure that the mobile charger 18 is authorized to supply power from the power socket assembly 14 to an electric vehicle parked adjacent thereto.

Conversely, the mobile charger 18 may generate a wireless OFF code signal when the mobile charger 18 is electrically disconnected from one of the power socket assemblies 14. The wireless OFF code signal indicates an OFF code. If the OFF code indicated by the wireless OFF code signal matches a predetermined OFF code, the charging station control module 20 generates the wireless control signal to turn off the power socket assembly 14 to which the mobile charger 18 is connected.

In the example shown in FIG. 1, a single power line (i.e., the power line 16) electrically connects the charging station 12 to all of the power socket assemblies 14. In addition, the charging station 12 and the power socket assemblies 14 are disposed in a straight line. In other examples, the charging station 12 may be electrically connected to the power socket assemblies 14 using multiple power lines. Additionally or alternatively, the charging station 12 and the power socket assemblies 14 may be arranged in layouts other than a straight line.

Figure 2:
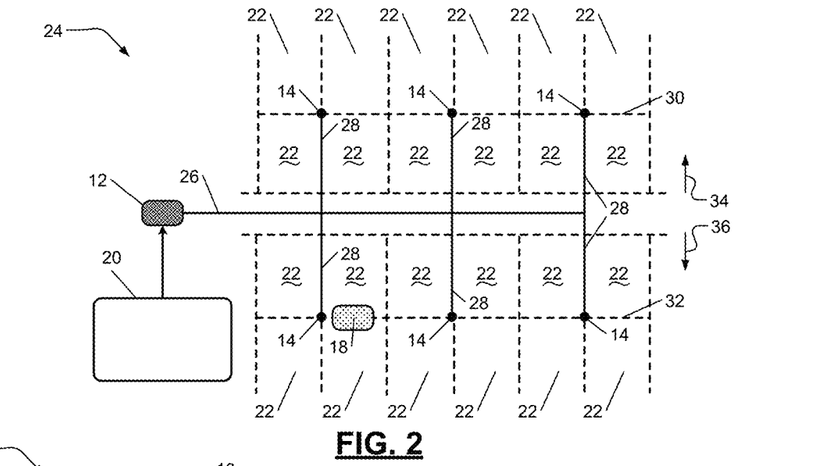
FIG. 2 is a functional block diagram illustrating a second example of a power distribution system according to the present disclosure.

Referring now FIG. 2, a power distribution system 24 is similar or identical to the power distribution system 10 except that the power line 16 is replaced with a main power line 26 and branch power lines 28. The main power line 26 electrically connects the charging station 12 to the branch power lines 28. Each branch power linen 28 electrically connects the main power line 26 to one of the power socket assemblies 14.

The power distribution system 24 also differs from the power distribution system 10 because all of the power socket assemblies 14 are not arranged in a straight line with the charging station 12 or with each other. Instead, one-half of the power socket assemblies 14 are disposed along a first line 30, and the other half of the power socket assemblies 14 are disposed along a second line 32. The first line 30 is offset from the main power line 26 in a first direction 34, and the second line 32 is offset from the main power line 26 in a second direction 36 that is opposite of the first direction 34. The layout shown in FIG. 2 may enable the charging station 12 to supply power to more electric vehicles relative to the layout shown in FIG. 1.

Figure 3:
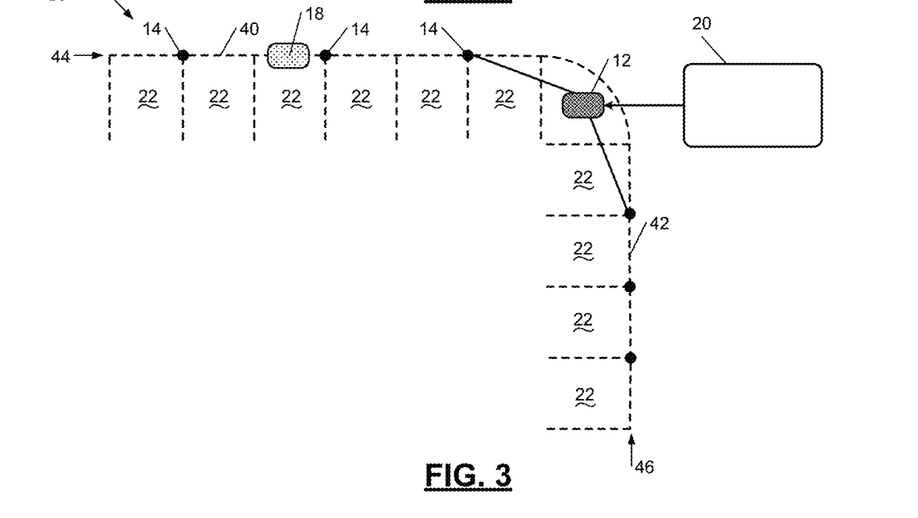
FIG. 3 is a functional block diagram illustrating a third example of a power distribution system according to the present disclosure.

Referring now FIG. 3, a power distribution system 38 is similar or identical to the power distribution system 10 except that the power line 16 is replaced with a first power line 40 and a second power line 42. The first power line 40 extends from a first side of the charging station 12 and electrically connects the charging station 12 to a first subset 44 of the power socket assemblies 14. The second power line 42 extends from a second side of the charging station 12 opposite of the first side and electrically connects the charging station 12 to a second subset 46 of the power socket assemblies 14.

The power distribution system 38 also differs from the power distribution system 10 because all of the power socket assemblies 14 are not arranged in a straight line with the charging station 12 or with each other. Instead, the first subset 44 of the power socket assemblies 14 are disposed along the first power line 40, and the second subset 46 of the power socket assemblies 14 are disposed along the second power line 42. The first and second power lines 40 and 42 are oriented at a non-zero angle (e.g., 90 degrees) relative to one another. The layout shown in FIG. 3 enables the charging station 12 to supply power to electric vehicles parked in perpendicular rows of the parking spaces 22.

Referring now to FIGS. 4 through 7, an example implementation of each power socket assembly 14 includes a power socket 52, a switch 54, a socket cover 56, a socket enclosure 57, an electric motor 58, one or more gears 60, and a power socket control module 62. The switch 54 includes an input 64 electrically connected to a power line 66 and an output 68 electrically connected to the power socket 52. The power socket control module 62 closes the switch 54 to supply power from the power line 66 to the power socket 52. Closing the switch 54 turns on the respective power socket assembly 14. The power socket control module 62 opens the switch 54 to interrupt power supply from the power line 66 to the power socket 52. Opening the switch 54 turns off the respective power socket assembly 14. The power socket control module 62 may open or close the switch 54 in response to the wireless switch control signal generated by the charging station control module 20.

The socket cover 56 is operable to open and close. The socket cover 56 allows access to the power socket 52 when the socket cover 56 is open. The socket cover 56 prevents access to the power socket 52 when the socket cover 56 is closed. The electric motor 58 is operable to open and close the socket cover 56. The socket enclosure 57 houses the power socket 52, the switch 54, the electric motor 58, and the gears 60. The power socket control module 62 controls the electric motor 58 to open and close the socket cover 56. The power socket control module 62 may open and close the socket cover 56 in response to a wireless cover control signal. The power socket control module 62 outputs signals to the switch 54 and the socket cover 56 to control these components. Although the power socket control module 62 is shown separate from the socket enclosure 57 in FIG. 4, the socket enclosure 57 may also house the power socket control module 62.

Figure 4:
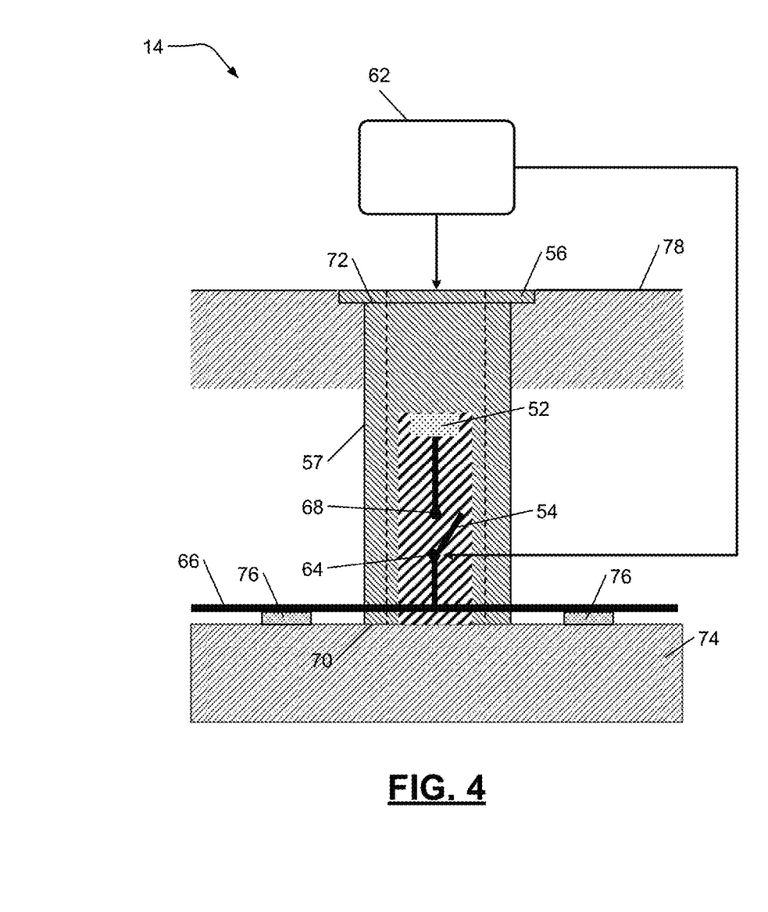
FIG. 4 is a section view of an example power socket assembly according to the present disclosure.

The socket enclosure 57 has a lower end 70, an upper end 72 opposite of the lower end 70, and a channel 73 extending through the socket enclosure 57 from the lower end 70 to the upper end 72. The lower end 70 of the socket enclosure 57 is supported by a base 74. The power socket 52 is disposed within the channel 73 in the socket enclosure 57. The socket cover 56 is fitted to the upper end 72 of the socket enclosure 57. The socket cover 56 covers the channel 73 in the socket enclosure 57 when the socket cover 56 is closed. In the example shown, the base 74 also supports the power line 66 via a pair of pads 76, which may be made of electrically insulating material. In addition, the power line 66, the socket enclosure 57, and the base 74 are disposed beneath a ground surface 78, and the socket cover 56 is disposed at the ground surface 78.

The gears 60 mechanically connect the electric motor 58 to the socket cover 56. In the example shown, the gears 60 include a first gear 80 and a second gear 82 that are engaged with one another. The first gear 80 has a first diameter, and the second gear 82 has a second diameter that is greater than the first diameter. The first gear 80 is driven by the electric motor 58 via a shaft 84 that is fixed (e.g., keyed) to the first gear 80 for rotation therewith. The shaft 84 may be considered part of the electric motor 58. The second gear 82 mechanically connects the first gear 80 to the socket cover 56. The electric motor 58 opens the socket cover 56 by rotating the shaft 84 and the first gear 80 in a first direction 83. The electric motor 58 closes the socket cover 56 by rotating the shaft 84 and the first gear 80 in a second direction 85 opposite of the first direction 83.

Figure 5:
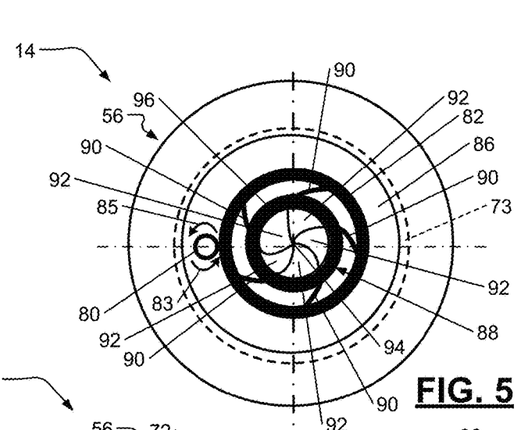
FIG. 5 is a bottom view of the power socket assembly of FIG. 4.
Figure 6:
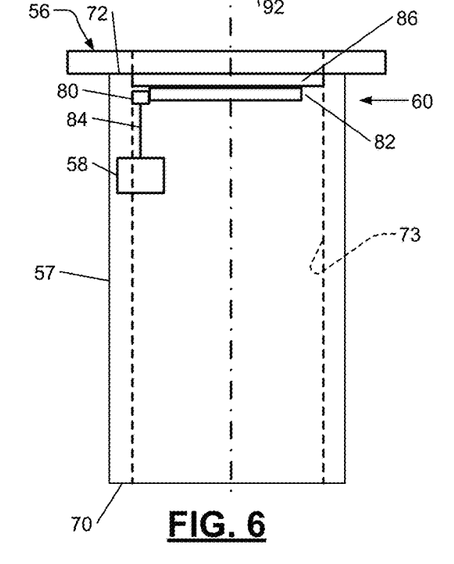
FIG. 6 is a side view of the power socket assembly of FIG. 4.
Figure 7:
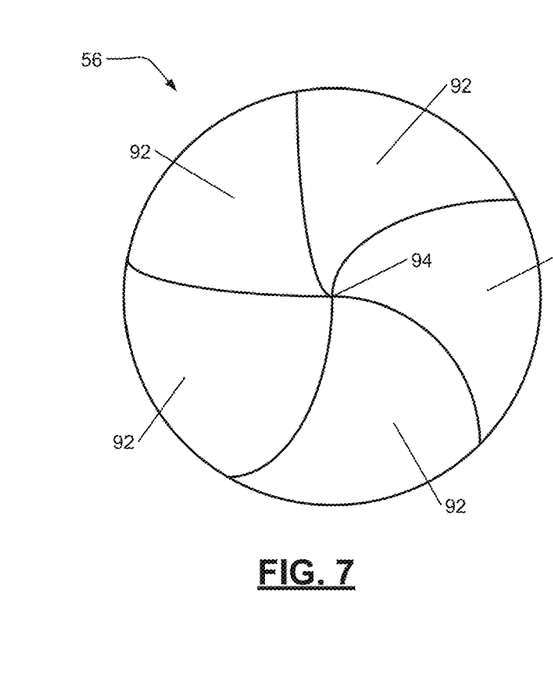
FIG. 7 is a top view of a remotely controllable socket cover included in the power socket assembly of FIG. 4.

The socket cover 56 includes a top cover ring 86, a cover slide subassembly 88, and connecting pieces 90 linking the cover slide subassembly 88 to the second gear 82. The connecting pieces 90 may be referred to as linkages. The cover slide subassembly 88 includes spiral-shaped shutters 92 that are moveable in a radial direction between a first position and a second position. The socket cover 56 is open when the shutters 92 are in the first position. The socket cover 56 is closed when the shutters 92 are in the second position as shown in FIGS. 5 and 7. Each connecting piece 90 links one of the shutters 92 to the second gear 82.

When the electric motor 58 rotates the shaft 84 and the first gear 80 in the first direction, the first gear 80 rotates the second gear 82 in the second direction. In turn, the second gear 82 moves the shutters 92, via the connecting pieces 90, radially outward away from a center 94 of the cover slide subassembly 88 and toward an outer diameter 96 of the cover slide subassembly 88. When the electric motor 58 rotates the shaft 84 and the first gear 80 in the second direction, the first gear 80 rotates the second gear 82 in the first direction. In turn, the second gear 82 moves the shutters 92, via the connecting pieces 90, radially inward away from the outer diameter 96 of the cover slide subassembly 88 and toward the center 94 of the cover slide subassembly 88. The shutters 92 may move in a spiral manner toward and away from the center 94 of the cover slide assembly 88.

Figures 8, 9, 10:
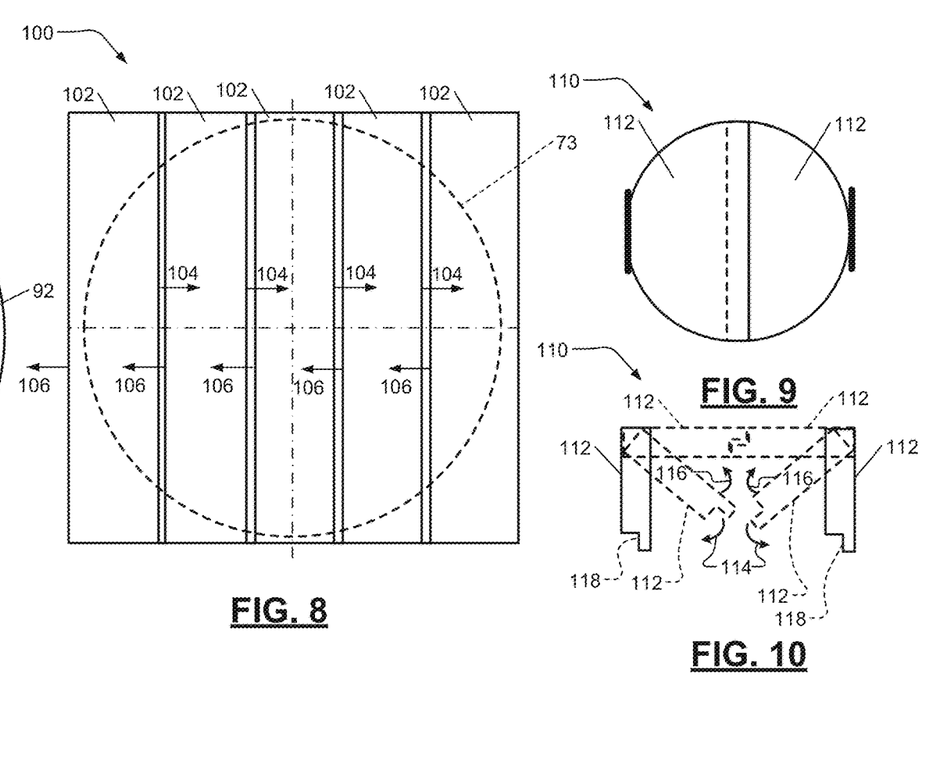
FIG. 8 is a top view of a second example of a remotely controllable socket cover according to the present disclosure.
FIG. 9 is a top view of a third example of a remotely controllable socket cover according to the present disclosure.
FIG. 10 is a side view of the remotely controllable socket cover of FIG. 9.

Referring now to FIG. 8, a socket cover 100 may be used in place of the socket cover 56. The socket cover 100 includes rectangular-shaped shutters 102 that are moveable between a first position and a second position. The socket cover 100 is open when the shutters 102 are in the first position. The socket cover 100 is closed when the shutters 102 are in the second position as shown in FIG. 8. Each shutter 102 is translated in a first direction 104 to open the socket cover 100. Each shutter 102 is translated in a second direction 106 opposite the first direction 104 to close the socket cover 100.

As with the socket cover 56, the socket cover 100 may be open or closed by operating the electric motor 58. In one example, each connecting piece 90 links one of the shutters 102 to the second gear 82. In turn, the electric motor 58 moves the shutters 102 in the first and second directions 104 and 106 when the electric motor 58 rotates the first gear 80 in the first and second directions 83 and 85, respectively.

Referring now to FIGS. 9 and 10, a socket cover 110 may be used in place of the socket cover 56. The socket cover 110 includes a pair of semicircular shutters 112 that are moveable between a first position and a second position. The socket cover 110 is open when the shutters 112 are in the first position as shown by the sold line depiction of the shutters 112 in FIG. 10. The socket cover 110 is closed when the shutters 112 are in the second position as shown in FIG. 9 and by the dashed line depiction of the shutters 112 in FIG. 10. Each shutter 112 is rotated in a first direction 114 to open the socket cover 110. Each shutter 112 is rotated in a second direction 116 opposite the first direction 114 to close the socket cover 110.

In the example shown, each shutter 112 defines a ledge 118 that engages the ledge 118 on the other shutter 112 to create a seal therebetween when the socket cover 110 is closed. The ledge 118 of the shutter 112 on the left side of FIG. 10 faces downward, and the ledge 118 of the shutter 112 on the right side of FIG. 10 faces upward. Thus, when the socket cover 110 is opened, the shutter 112 on the right side of FIG. 10 is rotated in the first direction 114 first, and then the shutter 112 on the left side of FIG. 10 is rotated in the first direction 114. Conversely, when the socket cover 110 is closed, the shutter 112 on the left side of FIG. 10 is rotated in the second direction 116 first, and then the shutter 112 on the right side of FIG. 10 is rotated in the second direction 116.

As with the socket cover 56, the socket cover 110 may be open or closed by operating the electric motor 58. In one example, each connecting piece 90 links one of the shutters 112 to the second gear 82. In turn, the electric motor 58 moves the shutters 112 in the first and second directions 114 and 116 when the electric motor 58 rotates the first gear 80 in the first and second directions 83 and 85, respectively.

Figure 11:
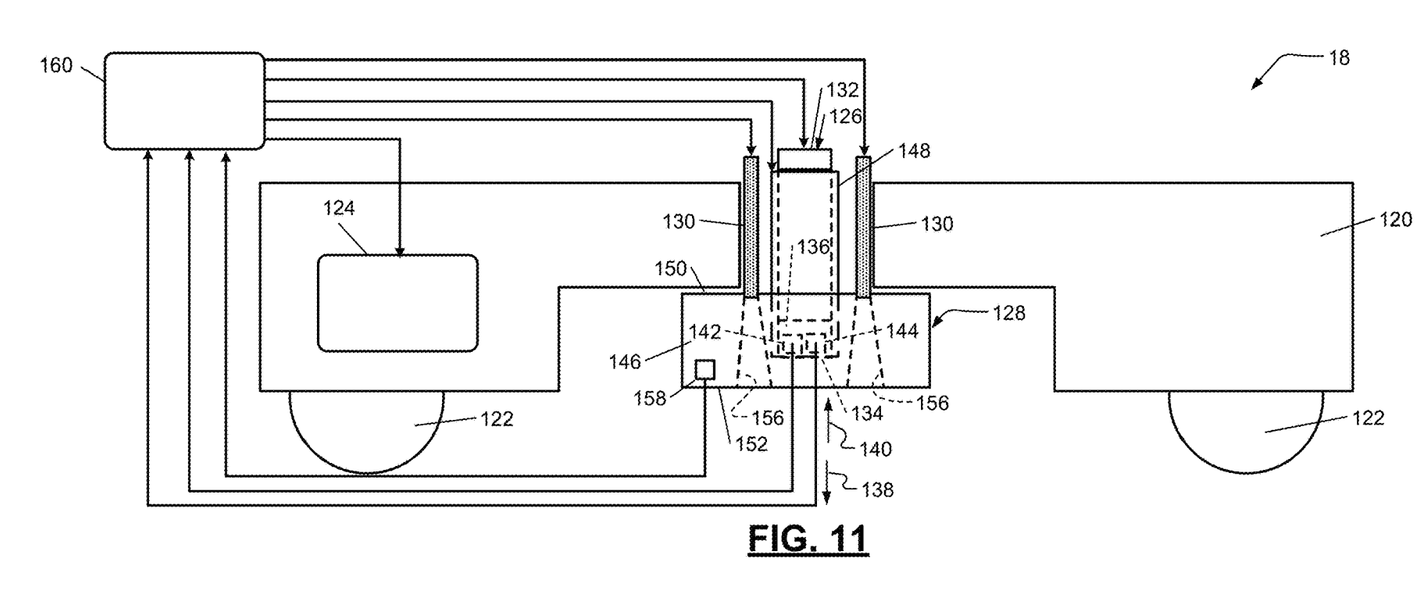
FIG. 11 is a side view of an electric vehicle (EV) mobile charger including an actuatable power connection mechanism according to the present disclosure.
Figure 12:
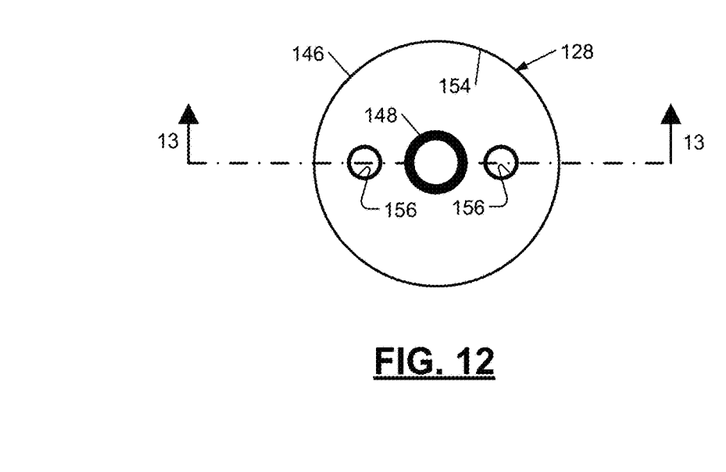
FIG. 12 is a top view of a portion of the EV mobile charger of FIG. 11.
Figure 13:
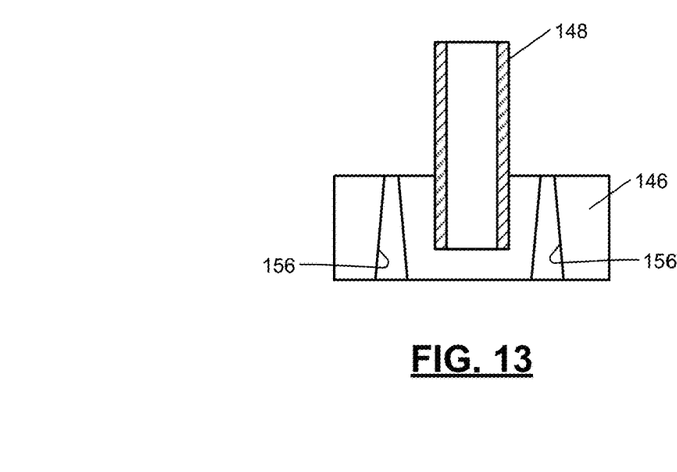
FIG. 13 is a section view of a portion of the EV mobile charger of FIG. 11 taken along a line 13-13 shown in FIG. 12.

Referring now to FIGS. 11 through 13, an example implementation of the mobile charger 18 includes a base 120, wheels 122, one or more electric motors 124, an electrical connector 126, a protection shield assembly 128, and a pair of air nozzles 130. The wheels 122 are attached to the base 120 in a manner that allows the wheels 122 to rotate. The electric motor(s) 124 is/are connected to at least one of the wheels 122 and is/are operable to drive the wheel(s) to which electric motor(s) 124 is/are connected. In one example, each wheel 122 is independently driven by one electric motor 124 such that the mobile charger 18 can be moved forward and backward and steered left or right simply by operating the electric motors 124. In another example, the mobile charger 18 may include a steering mechanism (not shown) that is connected to at least two of the wheels 122 and is operable to steer the mobile charger 18 left or right.

The electrical connector 126 is configured to electrically connect the battery of an electric vehicle to the power socket 52 of any one of the power socket assemblies 14. The electrical connector 126 has an upper end 132 and a lower end 134 opposite of the upper end 132. The electrical connector 126 includes a power plug 136 integrated into the lower end 134 thereof. The upper end 132 of the electrical connector 126 may be manually connected to the battery of an electric vehicle using a power cord. Alternatively, the mobile charger 18 may include a robot (not shown) operable to automatically connect the upper end 132 of the electrical connector 126 to the battery of an electric vehicle using a power cord.

The electrical connector 126 is operable to extend from the base 120 in a first direction 138 to insert the power plug 136 into the power socket 52 of any one of the power socket assemblies 14 when the electrical connector 126 is positioned above the power socket 52. The electrical connector 126 is operable to retract into the base 120 in a second direction 140 opposite of the first direction 138 to withdraw the power plug 136 from the power socket 52. The mobile charger 18 may include a linear actuator (not shown) operable to translate the electrical connector 126 and the first and second directions 138 and 140.

The electrical connector 126 further includes a camera or image sensor 142 integrated into the power plug 136 and a contact sensor 144 integrated into the power plug 136. The image sensor 142 is configured to capture digital images of objects disposed below the electrical connector 126 and to output a signal indicating the captured images. The contact sensor 144 is configured to detect when the power plug 136 is in contact with another object, such as the power socket 52 of any one of the power socket assemblies 14, and to output a signal indicating the same.

The protection shield assembly 128 includes a protection shield 146 and a hollow shaft 148 that is fixed to or integrally formed with the protection shield 146. The electrical connector 126 is translatable in the first and second directions 138 and 140 through the hollow shaft 148. The protection shield 146 has a cylindrical shape with an upper end 150 and a lower end 152 opposite of the upper end 150. The protection shield assembly 128 further includes an annular seal 154 disposed around the lower end 152 of the protection shield 146. The annular seal 154 is configured to seat against the outer perimeter of the socket cover 56, or a portion of the socket enclosure 57 surrounding the socket cover 56, to form a seal therewith. The annular seal 154 may be made from rubber.

The protection shield assembly 128 is operable to extend from the base 120 in the first direction 138 to create a seal with the outer perimeter of the socket cover 56 of any one of the power socket assemblies 14 or a portion of the socket enclosure 57 surrounding the socket cover 56. The protection shield assembly 128 is operable to retract into the base 120 in the second direction 140 to break the seal. The mobile charger 18 may include a linear actuator (not shown) operable to translate the protection shield assembly 128 and the first and second directions 138 and 140.

In the example shown, the protection shield 146 defines a pair of air channels 156. Each air channel 156 is in fluid communication with one of the air nozzles 130 to allow the air nozzle 130 to spray air through the protection shield 146 via the air channel 156. The air sprayed by the air nozzles 130 may be supplied by an air compressor (not shown), which may be onboard (or part of) the mobile charger 18. The air nozzles 130 are operable to spay air toward the socket cover 56 of any one of the power socket assemblies 14 to remove moisture or debris from the socket cover 56. An air hose may be integrated into each air nozzle 130 or connected thereto. The protection shield 146 may also define a connector channel that allows the electrical connector 126 to slide through the protection shield 146 via the connector channel to connect the power plug 136 to the power socket 52 or disconnect the power plug 136 from the power socket 52. Alternatively, the hollow shaft 148 may extend to the lower end 152 of the protection shield 146.

The protection shield assembly 128 further includes a seal sensor 158 integrated into the lower end 152 of the protection shield 146. The seal sensor 158 is configured to detect whether the protection shield 146 has formed a seal with the socket cover 56 of any one of the power socket assemblies 14 or with a portion of the socket enclosure 57 surrounding the socket cover 56. The contact sensor 144 and/or the seal sensor 158 may be a proximity sensor.

The example implementation of the mobile charger 18 shown in FIG. 11 through 13 further includes a mobile charger control module 160. The mobile charger control module 160 is configured to control the electric motor 124 to move the mobile charger 18 in order to align the power plug 136 with the power socket 52 of any one of the power socket assemblies 14. In addition, the mobile charger control module 160 is configured to control the electrical connector 126, or a linear actuator connected thereto, to extend and retract the electrical connector 126 in the first and second directions 138 and 140. Furthermore, the mobile charger control module 160 is configured to control the protection shield assembly 128, or a linear actuator connected thereto, to extend and retract the protection shield assembly 128 in the first and second directions 138 and 140. Moreover, the mobile charger control module 160 is configured to control the air nozzles 130 to spray air toward the socket cover 56 of one of the power socket assemblies 14 above which the mobile charger 18 is disposed. The mobile charger control module 160 outputs signals to the electric motor 124, the electrical connector 126, the protection shield assembly 128, and the air nozzles 130 to control the same.

The mobile charger control module 160 may output the wireless cover control signal in response to which the power socket control module 62 opens and closes the socket cover 56 of the respective power socket assembly 14. Alternatively, the charging station control module 20 may output the wireless cover control signal. Each of the modules 20, 62, 160 may include a transceiver for wirelessly communicating with one another.

Figure 14:
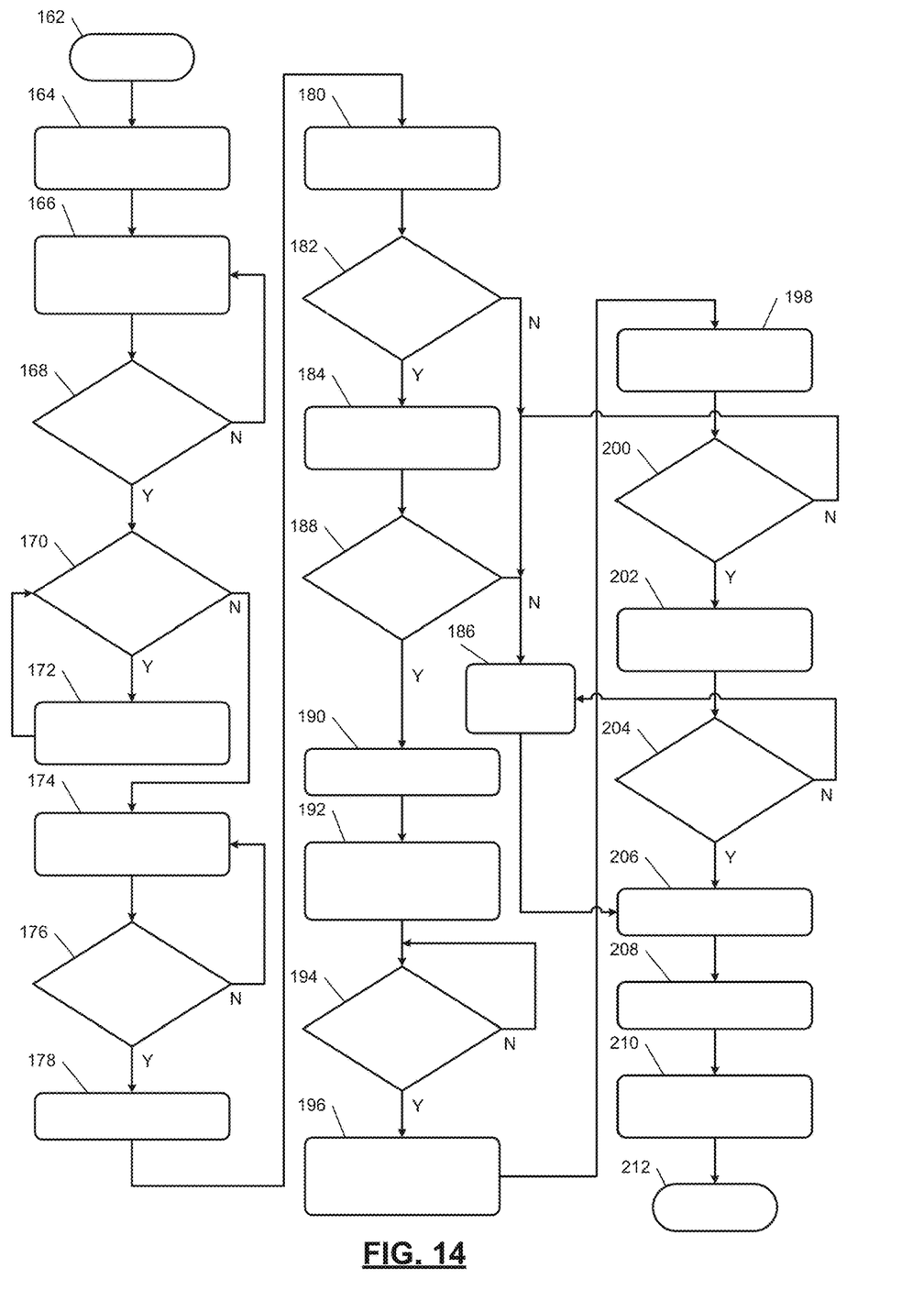
FIG. 14 is a flowchart illustrating an example method of controlling a power distribution system according to the present disclosure.
Figure 15:
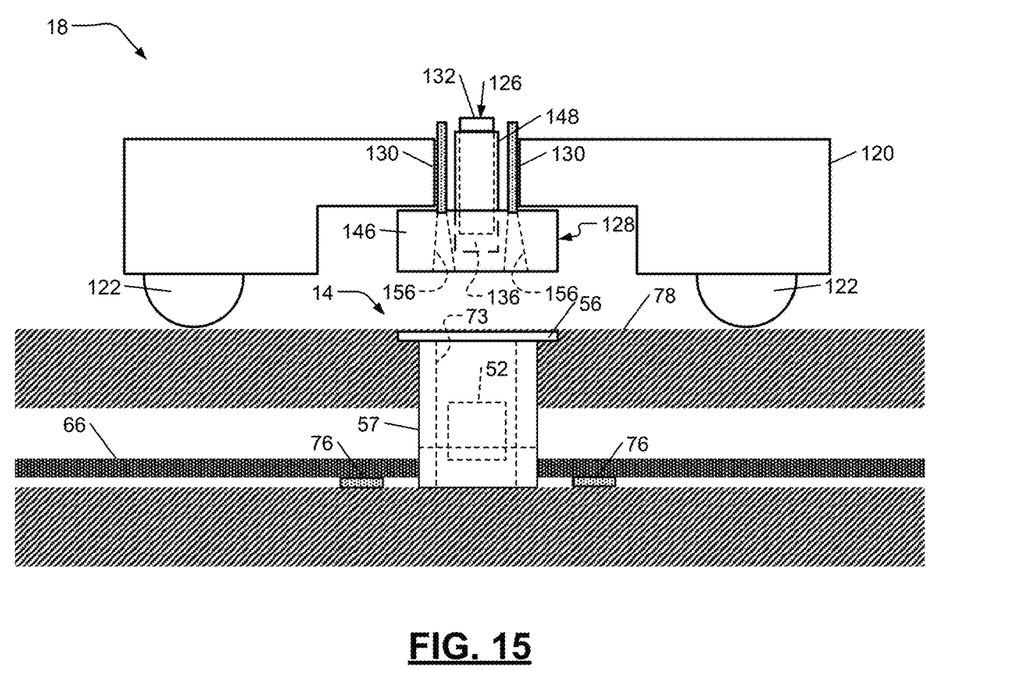
FIG. 15 is a side view of the EV mobile charger of FIG. 11 positioned above the power socket assembly of FIG. 4 with the power connection mechanism in a retracted position.
Figure 16:
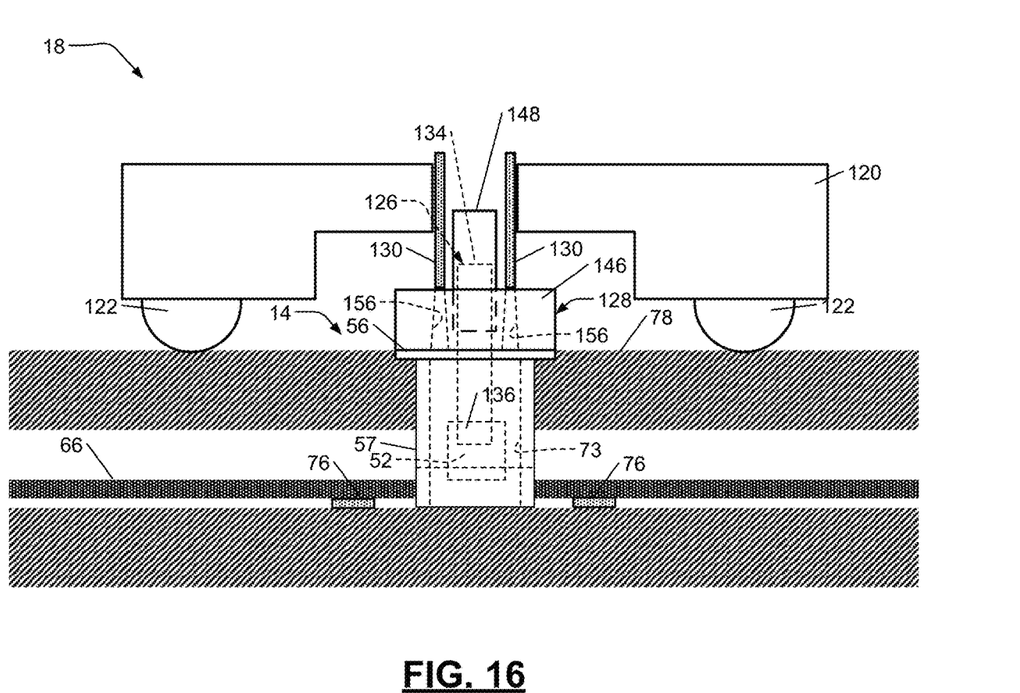
FIG. 16 is a side view of the EV mobile charger of FIG. 11 positioned above the power socket assembly of FIG. 4 with the power connection mechanism in an extended position.

Referring now to FIGS. 14 through 16, an example method for controlling any one of the power distribution systems 10, 24, 38 begins at 162. The method is described in the context of the modules 20, 62, 160. However, the particular modules that perform the steps of the methods may be different than the modules mentioned in the above descriptions of the methods. Additionally or alternatively, one or more steps of the methods may be implemented apart from the modules 20, 62, 160.

At 164, the charging station control module 20 selects an electric vehicle to charge from any electric vehicle parked in the parking spaces 22. The charging station control module 20 may make the selection based on the order in which electric vehicles parked in the parking spaces 22 and/or the proximity of the electric vehicles to the mobile charger 18. For example, the charging station control module 20 may charge the electric vehicles in the same order in which the electric vehicles parked in the parking spaces 22. In another example, the charging station control module 20 may charge the electric vehicle that is closest to the mobile charger 18 and has not yet been charged. The charging station control module 20 may determine when the electric vehicles are parked in the parking spaces 22 and/or the proximity of the electric vehicles to the mobile charger 18 using proximity sensors positioned in or near the parking spaces 22. The charging station control module 20 outputs a wireless signal indicating the selected electric vehicle.

At 166, the mobile charger control module 160 moves the mobile charger 18 to position the mobile charger 18 above one of the power socket assemblies 14 that is near (e.g., closest to) the selected electric vehicle. In addition, the mobile charger control module 160 moves the mobile charger 18 to align the power plug 136 with the center 94 of the socket cover 56 of the power socket assembly 14 as shown in FIG. 15. The mobile charger control module 160 may perform each of these tasks based on an input from the image sensor 142 and/or using predetermined position coordinates (e.g., a global positioning system (GPS) coordinates).

At 168, the mobile charger control module 160 determines whether the power plug 136 is aligned with the center 94 of the socket cover 56. If the power plug 136 is aligned with the center 94 of the socket cover 56, the method continues at 170. Otherwise, the method remains at 166.

At 170, the mobile charger control module 160 determines whether moisture (e.g., snow, water) or debris (e.g., stones, dirt) is on the top surface of the socket cover 56 based on the input from the image sensor 142. If moisture or debris is on the top surface of the socket cover 56, the method continues at 172 before continuing to 174. Otherwise, the method continues directly to 174. At 172, the mobile charger control module 160 controls the air nozzle 130 to spray air at the top surface of the socket cover 56 to clear the moisture or debris therefrom. The method then returns to 170. At 174, the mobile charger control module 160 lowers the protection shield assembly 128 toward the socket cover 56. The mobile charger control module 160 may maintain the electrical connector 126 in its retracted position shown in FIG. 15 while lowering the protection shield assembly 128.

At 176, the mobile charger control module 160 determines whether the protection shield 146 is in contact with and sealed to the socket cover 56 as shown in FIG. 16. The mobile charger control module 160 may make this determination based on an input from the contact sensor 144. If the protection shield 146 is in contact with and sealed to the socket cover 56, the method continues at 178. Otherwise, the method remains at 174. At 178, the charging station control module 20 or the mobile charger control module 160 generates the wireless cover control signal, and the power socket control module 62 opens the socket cover 56 in response to the wireless cover control signal. At 180, the mobile charger control module 160 lowers the electrical connector 126 to insert the power plug 136 into the power socket 52 as shown in FIG. 16. In turn, the electrical connector 126 moves downward relative to both the base 120 and the protection shield assembly 128.

At 182, the mobile charger control module 160 determines whether the power plug 136 inserts securely into the power socket 52. If the power plug 136 inserts securely into the power socket 52, the method continues at 184. Otherwise, the method continues at 186. At 184, the mobile charger control module 160 generates the wireless ON code signal. At 186, the mobile charger control module 160 sends an alarm to an operator by, for example, transmitting a wireless signal to a cloud computing network or a user interface device.

At 188, the charging station control module 20 determines whether the ON code indicated by the wireless ON code signal is authentic. For example, the charging station control module 20 may determine whether the ON code indicated by the wireless ON code signal matches the predetermined ON code. If the ON code indicated by the wireless ON code signal is authentic, the method continues at 190. Otherwise, the method continues at 186.

At 190, the charging station control module 20 generates the wireless switch control signal to turn on the power socket 52, and the power socket control module 62 closes the switch 54 in response to the wireless switch control signal. At 192, the mobile charger 18 connects the power plug 136 to the battery of the electric vehicle by, for example, connecting one end of a power cord to the upper end 132 of the electrical connector 126 and the other end of the power cord to the battery. In turn, the battery begins charging.

At 194, the charging station control module 20 determines whether the charging is complete. The charging station control module 20 may determine that charging is complete when a predetermined period has elapsed after the power socket 52 is turned on and/or the power plug 136 is connected to the battery of the electric vehicle. Alternatively, the charging station control module 20 may determine whether charging is complete based on a wireless signal generated by the electric vehicle indicating the charge status of the battery of the electric vehicle. If charging is complete, the method continues at 196. Otherwise, the method remains at 194.

At 196, the mobile charger 18 disconnects the power plug 136 from the battery of the electric vehicle by, for example, disconnecting the power cord from the upper end 132 of the electrical connector 126 and/or disconnecting the power cord from the battery. At 200, the mobile charger control module 160 determines whether the power plug 136 withdraws from the power socket 52. If the power plug 136 does withdraw from the power socket 52, the method continues at 202. Otherwise, the method continues at 186. At 202, the mobile charger control module 160 generates the wireless OFF code signal.

At 204, the charging station control module 20 determines whether the OFF code indicated by the wireless OFF code signal is authentic. For example, the charging station control module 20 may determine whether the OFF code indicated by the wireless OFF code signal matches the predetermined OFF code. If the OFF code indicated by the wireless OFF code signal is authentic, the method continues at 206. Otherwise, the method continues at 186.

At 206, the charging station control module 20 generates the wireless switch control signal to turn off the power socket 52, and the power socket control module 62 opens the switch 54 in response to the wireless switch control signal. At 208, the charging station control module 20 or the mobile charger control module 160 generates the wireless cover control signal, and the power socket control module 62 closes the socket cover 56 in response to the wireless cover control signal. At 210, the mobile charger control module 160 raises the protection shield assembly 128 away from the socket cover 56. The mobile charger control module 160 maintains the electrical connector 126 in its retracted position shown in FIG. 15 while lowering the protection shield assembly 128. The method ends at 212.

The method of FIG. 14 may be repeated each time that an electric vehicle is parked in one of the parking spaces 22. Additionally or alternatively, the method of FIG. 14 may be repeated on a periodic basis. If there are no electric vehicles parked in the parking spaces 22 that have not yet been charged, then the charging station control module 20 may not select any electric vehicles to charge at 164, in which case the method may continue from 164 to 212.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power distribution system comprising:
    a charging station including a charging station control module;
    a plurality of power socket assemblies operable to supply power to a vehicle, wherein each of the power socket assemblies includes a power socket;
    at least one power line electrically connecting the charging station to each of the plurality of power socket assemblies, wherein the charging station is configured to supply power to any one of the plurality of power socket assemblies through the at least one power line; and
    a mobile charger including a power plug that is configured to electrically connect the vehicle to the power socket of any one of the plurality of power socket assemblies, wherein the mobile charger is operable to move to align the power plug with the power socket.

2. The power distribution system of claim 1 wherein the at least one power line includes a single power line that electrically connects the charging station to all of the plurality of power socket assemblies.

3. The power distribution system of claim 1 wherein the at least one power line includes a first power line and a second power line, the first power line electrically connecting the charging station to a first subset of the plurality of power socket assemblies, the second power line electrically connecting the charging station to a second subset of the plurality of power socket assemblies.

4. The power distribution system of claim 1 wherein the at least one power line includes a main power line and a plurality of branch power lines, the main power line electrically connecting the charging station to the plurality of branch power lines, each of the plurality of branch power lines electrically connecting the main power line to at least one of the plurality of power socket assemblies.

5. The power distribution system of claim 1 wherein each of the plurality of power socket assemblies includes a switch operable to regulate current flow from the at least one power line to the power socket.

6. The power distribution system of claim 5 wherein each of the plurality of power socket assemblies further includes a power socket control module configured to open and close the switch in response to a wireless control signal.

7. The power distribution system of claim 5 wherein:
    each of the plurality of power socket assemblies further includes a socket cover that allows access to the respective socket when the socket cover is open and prevents access to the respective socket when the socket cover is closed; and
    each of the plurality of power socket assemblies further includes a power socket control module configured to open and close the socket cover in response to a wireless control signal.

8. The power distribution system of claim 1 wherein:
the mobile charger further includes a base, a plurality of wheels attached to the base, and an electrical connector into which the power plug integrated, and
the electrical connector is configured to extend and retract relative to the base to respectively insert the power plug into the power socket of any one of the plurality of power socket assemblies and withdraw the power plug from the power socket.

9. The power distribution system of claim 1 wherein:
the mobile charger further includes a mobile charger control module and a contact sensor integrated into the power plug; and
the mobile charger control module is configured to determine whether the power plug is inserted into the power socket of any one of the plurality of power socket assemblies based on an input from the contact sensor.

10. The power distribution system of claim 9 wherein:
the mobile charger control module is configured to generate a wireless ON code signal when the power plug is inserted into the power socket of any one of the plurality of power socket assemblies; and
in response to the wireless ON code signal, the charging station control module is configured to close a switch in the respective one of the plurality of power socket assemblies to supply power to the power socket of the respective one of the plurality of power socket assemblies.

11. The power distribution system of claim 9 wherein:
the mobile charger control module is configured to generate a wireless OFF code signal when the power plug is withdrawn from the power socket of any one of the plurality of power socket assemblies; and
in response to the wireless OFF code signal, the charging station control module is configured to open a switch in the respective one of the plurality of power socket assemblies to interrupt power supply to the power socket of the respective one of the plurality of power socket assemblies.

12. The power distribution system of claim 1 wherein:
the mobile charger further includes a mobile charger control module and an image sensor integrated into the power plug; and
the mobile charger control module is configured to determine whether the power plug is aligned with the power socket of any one of the plurality of power socket assemblies based on an input from the image sensor.

13. The power distribution system of claim 1 wherein:
the mobile charger further includes a mobile charger control module, an image sensor integrated into the power plug, and an air nozzle; and
each of the plurality of power socket assemblies further includes a socket cover operable to open and close to respectively allow and prevent access to the respective socket; and
the mobile charger control module is configured to:
determine whether a substance is disposed on a top surface of the socket cover of any one of the plurality of power sockets assemblies based on an input from the image sensor; and
control the air nozzle to spray air toward the socket cover when the substance is disposed on the top surface of the socket cover.

14. The power distribution system of claim 13 wherein:
the mobile charger further includes a base, a plurality of wheels attached to the base, and a protection shield coupled to the base; and
the protection shield is configured to extend and retract relative to the base to respectively create a seal around the socket cover of any one of the plurality of power socket assemblies and break the seal.

* * * * *